(12) United States Patent
Yang et al.

(10) Patent No.: US 12,361,448 B2
(45) Date of Patent: Jul. 15, 2025

(54) SYSTEMS AND METHODS FOR INTEGRATED MULTI-FACTOR MULTI-LABEL ANALYSIS

(71) Applicant: PAYPAL, INC., San Jose, CA (US)

(72) Inventors: Yaqin Yang, Santa Clara, CA (US); Nitin Sharma, San Jose, CA (US); Fransisco Kurniadi, Dublin, CA (US); Yang Wu, Milpitas, CA (US)

(73) Assignee: PAYPAL, INC., San Jose, CA (US)

( * ) Notice: Subject to any disclaimer, the term of this patent is extended or adjusted under 35 U.S.C. 154(b) by 21 days.

(21) Appl. No.: 18/186,073

(22) Filed: Mar. 17, 2023

(65) Prior Publication Data
US 2023/0281659 A1     Sep. 7, 2023

Related U.S. Application Data

(63) Continuation of application No. 16/409,185, filed on May 10, 2019, now Pat. No. 11,610,077.

(51) Int. Cl.
*G06Q 30/0251* (2023.01)
*G06F 18/2113* (2023.01)
*G06F 18/2115* (2023.01)
*G06N 3/048* (2023.01)
*G06N 3/082* (2023.01)

(52) U.S. Cl.
CPC ..... *G06Q 30/0251* (2013.01); *G06F 18/2113* (2023.01); *G06F 18/2115* (2023.01); *G06N 3/048* (2023.01); *G06N 3/082* (2013.01)

(58) Field of Classification Search
CPC ............. G06Q 30/0251; G06F 18/2113; G06F 18/2115; G06N 3/048; G06N 3/082; G06N 3/045; G06N 3/084
See application file for complete search history.

(56) References Cited

U.S. PATENT DOCUMENTS

| | | | |
|---|---|---|---|
| 2015/0161522 A1* | 6/2015 | Saon | G06N 3/045 706/12 |
| 2015/0254675 A1* | 9/2015 | Kannan | G06Q 30/02 705/304 |
| 2017/0206450 A1 | 7/2017 | Umeda | |
| 2017/0249663 A1* | 8/2017 | Hajiyev | G06Q 30/0269 |
| 2020/0250185 A1 | 8/2020 | Anderson | |

OTHER PUBLICATIONS

Wikipedia., "Activation Function," Retrieved from Internet URL: https://web.archive.org/web/20190419110126/https://en.wikipedia.org/wiki/Activation_function, Apr. 2019, 9 pages.

* cited by examiner

*Primary Examiner* — Jianxun Yang
(74) *Attorney, Agent, or Firm* — HAYNES AND BOONE, LLP (57) ABSTRACT

Systems and methods for integrated multi-factor multi-label analysis include using one or more deep learning systems, such as neural networks, to analyze how well one or more entities are likely to benefit from a targeted action. Data associated with each of the entities is analyzed to determine a score for each of the proposed targeted actions using multiple analysis factors. The scores for each analysis factor are determined using a different multi-layer analysis network for each analysis factor. The scores for each analysis factor are then combined to determine an overall score for each of the proposed targeted actions. The entities and the proposed targeted actions with the highest scores are then identified and then used to determine which entities are to be the subject of which targeted actions.

20 Claims, 5 Drawing Sheets

SYSTEMS AND METHODS FOR INTEGRATED MULTI-FACTOR MULTI-LABEL ANALYSIS

PRIORITY INFORMATION

This present application is a continuation of U.S. patent application Ser. No. 16/409,185, filed May 10, 2019, and entitled "Systems and Methods for Integrated Multi-Factor Multi-Label Analysis," issued on Mar. 21, 2023, as U.S. Pat. No. 11,610,077, the entire disclosure of which are incorporated herein by reference.

TECHNICAL FIELD

The present disclosure relates generally to training and use of machine learning systems for multi-factor multi-label analysis to target actions based on profiles.

BACKGROUND

Systems are often called upon to analyze complex data sets and make recommendations regarding future actions to perform and on which entities to perform those actions. This may be further complicated when resources are limited and it is not possible and/or not practical to perform every possible action on each of the entities. Determining whether to perform a particular action from a set of possible actions and to decide which of the entities to perform the particular action on typically involve the consideration of different factors. However, because the relationships and/or interactions between the factors and the different possible actions are not always fully understood and/or not easily modeled, it is not always clear how to evaluate each of the possible actions against each of the factors. Additionally, it is also difficult to determine how to combine and/or aggregate each of the separate factors into an overall evaluation of the value of performing one of the possible actions, especially when each of the factors may make at least partially contradictory recommendations regarding the performance of a possible action for a possible entity.

Accordingly, it would be advantageous to have systems and methods for evaluating data associated with multiple entities against multiple factors in order to make recommendations on whether to perform one or more actions from a set of possible actions and on which of the entities to perform the one or more actions.

BRIEF DESCRIPTION OF THE DRAWINGS

In the figures, elements having the same designations have the same or similar functions.

DETAILED DESCRIPTION

Multi-factor multi-label analysis involves the evaluation of data against multiple factors to generate weighted scores and/or recommendations for multiple labels corresponding to possible outcomes. Multi-factor multi-label analysis is a difficult task because it is not always clear what the models and/or relationships between data values in a data set (e.g., data corresponding to a profile for an entity) and each of the multiple factors that may be used to evaluate in order to determine which ones of a set of possible actions (e.g., represented as labels) are recommended to be performed. For example, multi-factor multi-label analysis may be used to predict possible future failures in a system based on a multi-factor (e.g., maintenance costs, downtime, equipment lifetime, and/or the like) analysis of past performance data, service records, and/or the like in order to recommend current preventative maintenance activities (e.g., change oil, replace tires, replace timing belt, and/or the like in the case of an automobile) that should be performed now. In other examples, multi-factor multi-label analysis may be used to recommend and/or generate targeted advertising for a set of products within a limited advertising budget, more efficiently target specific advertising campaigns for specific products to specific consumers that are more likely to respond favorably to (e.g., by purchasing the advertised product or service), predict fraud, and/or the like.

According to some embodiments, because of the difficulties in understanding the models and/or the relationships between the data in a profile, multiple evaluation factors, and multiple possible output labels, multi-factor multi-label analysis may benefit from deep learning systems, such as neural networks, that are able to use previously collected data to train the deep learning system to learn the models and relationships. A properly trained deep learning system for multi-factor multi-label analysis is able to take data values from a profile, consider it from the perspective of multiple evaluation factors (which may be conflicting, overlapping, interacting, and/or the like), and then make comparative recommendations for each of several output labels. The recommendations for the output labels may then be used to decide on which actions to perform, set a priority among the actions, set priorities between different entities associated with different profiles, and/or the like.

Figure 1:
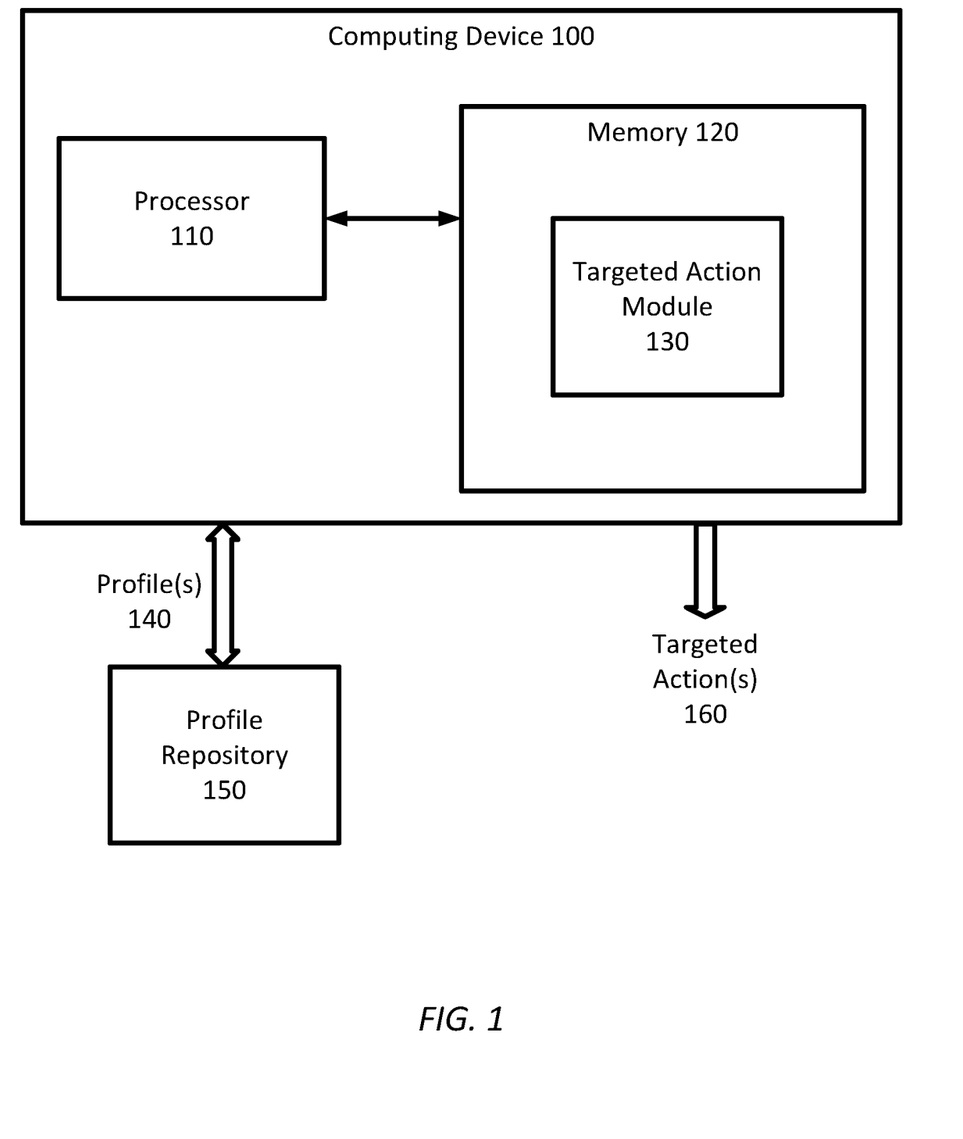
FIG. 1 is a simplified diagram of a computing device according to some embodiments.

FIG. 1 is a simplified diagram of a computing device 100 according to some embodiments. As shown in FIG. 1, computing device 100 includes a processor 110 coupled to a memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs), tensor processing units (TPUs), and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/ or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

As shown, memory 120 includes an action module 130 that may be used to access data associated with one or more profiles 140 stored in a profile repository. In some examples, each of the one or more profiles 140 is associated with a respective entity. Action module 130 may then analyze data from each of the profiles using a multi-factor multi-label analyzer that analyzes the data against a plurality of analysis factors to determine a factor score for each of a plurality of possible output labels or targets. The factor scores from each of the analysis factors may then be combined and/or aggregated to determine an overall score for each of the plurality of possible output labels and/or targets. The factor scores and/or the overall scores for each of the possible output labels and/or targets may then be used to determine which targeted actions 160, corresponding to the possible output labels, should be performed on behalf of which of the entities. In some examples, a profile repository 150 may be implemented using one or more data structures, one or more databases, one or more files, and/or the like.

In some examples, memory 120 may include non-transitory, tangible, machine readable media that includes executable code that when run by one or more processors (e.g., processor 110) may cause the one or more processors to perform the methods described in further detail herein. In some examples, action module 130 may be implemented using hardware, software, and/or a combination of hardware and software.

As discussed above and further emphasized here, FIG. 1 is merely an example which should not unduly limit the scope of the claims. One of ordinary skill in the art would recognize many variations, alternatives, and modifications. According to some embodiments, profile repository 150 may be consistent with any storage mechanism accessible by computing device 100. In some examples, profile repository 150 may be located in memory 120. In some examples, profile repository 150 may be located local to computing device 100, such as in one or more disk drives, solid-state drives, and/or the like. In some examples, profile repository 150 may be located remotely to computing device 100, such as in one or more computing devices, storage servers, and/or the like coupled to computing device 100 via a network, such as a local-area network (e.g., an ethernet), a wide-area network (e.g., the internet), and/or the like. In some examples, profile repository 150 may be located in cloud and/or other distributed storage.

Figure 2:
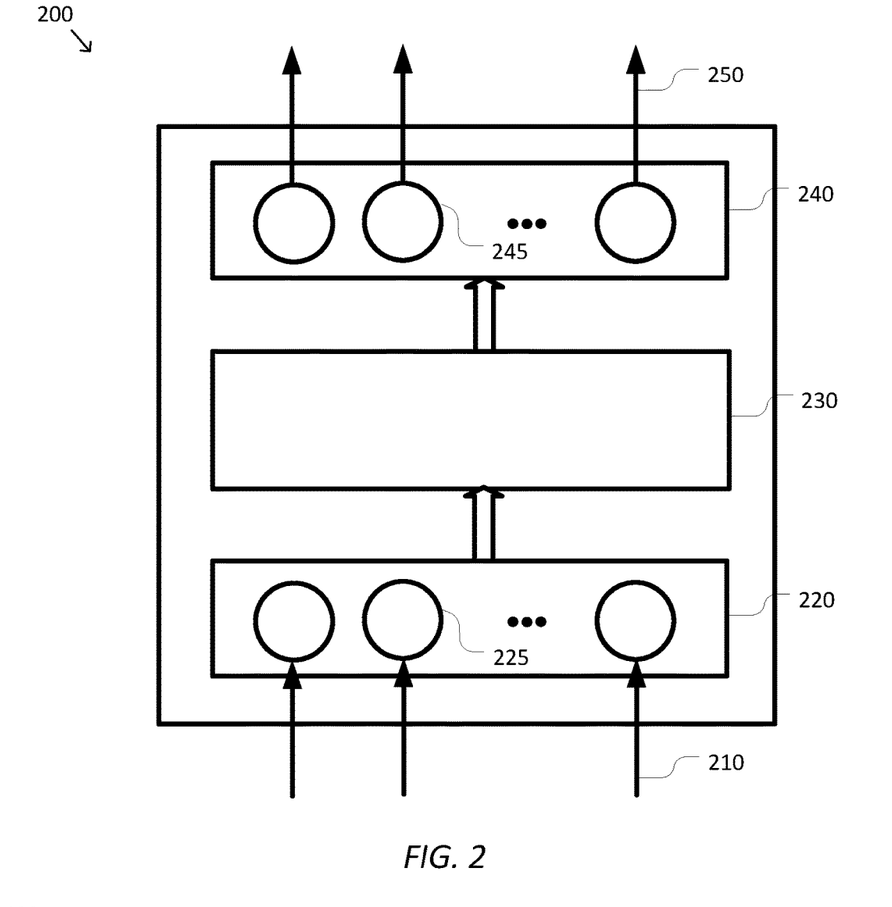
FIG. 2 is a simplified diagram of a multi-factor multi-label analyzer according to some embodiments.

FIG. 2 is a simplified diagram of a multi-factor multi-label analyzer 200 according to some embodiments. In some embodiments, multi-factor multi-label analyzer 200 is consistent with the type of multi-factor multi-label analyzer used by targeted action module 130 to analyze the data in the one or more profiles 140 to generate the scores for the plurality of possible output labels and/or targets. As shown in FIG. 2, multi-factor multi-label analyzer 200 is an example of a deep learning system, such as a neural network that can be used to analyze a plurality of inputs 210 and generate a plurality of outputs 250. In more detail, the plurality of inputs 210 is received by an input layer 220 that includes a plurality of neurons 225. In some examples, each of the plurality of neurons 225 is a perceptron. In some examples, each of the inputs 210 is received by one of the plurality of neurons 225, but other arrangements are possible. Input layer 220 helps prepare the inputs 210 for further processing by one or more hidden layers 230. The one or more hidden layers 230 are considered hidden because they are not directly connected to either inputs 210 or outputs 250. Each of the one or more hidden layers 230 may contain a plurality of neurons (not shown). In some examples, each of the plurality of neurons may be perceptrons. In some examples, the plurality of neurons may be densely connected with many of the plurality of neurons receiving inputs from most of the outputs from a previous hidden layer or, in the case of the first hidden layer, the outputs from input layer 220. In some examples, the plurality of neurons are fully connected with each of the plurality of neurons receiving each of the inputs received by that hidden layer. The outputs from the last hidden layer 230 is passed to an output layer 240 that includes a plurality of neurons 245. In some examples, each of the plurality of neurons 245 is a perceptron. In some examples, the plurality of neurons 245 may be densely and/or fully connected to the outputs of the last of the hidden layers 230. Each of the plurality of neurons 245 generates a respective one of the outputs 250. Each of the plurality of outputs 250 corresponds to a score for each of a plurality of labels or targets that are being analyzed by multi-factor multi-label analyzer 200.

Figure 3:
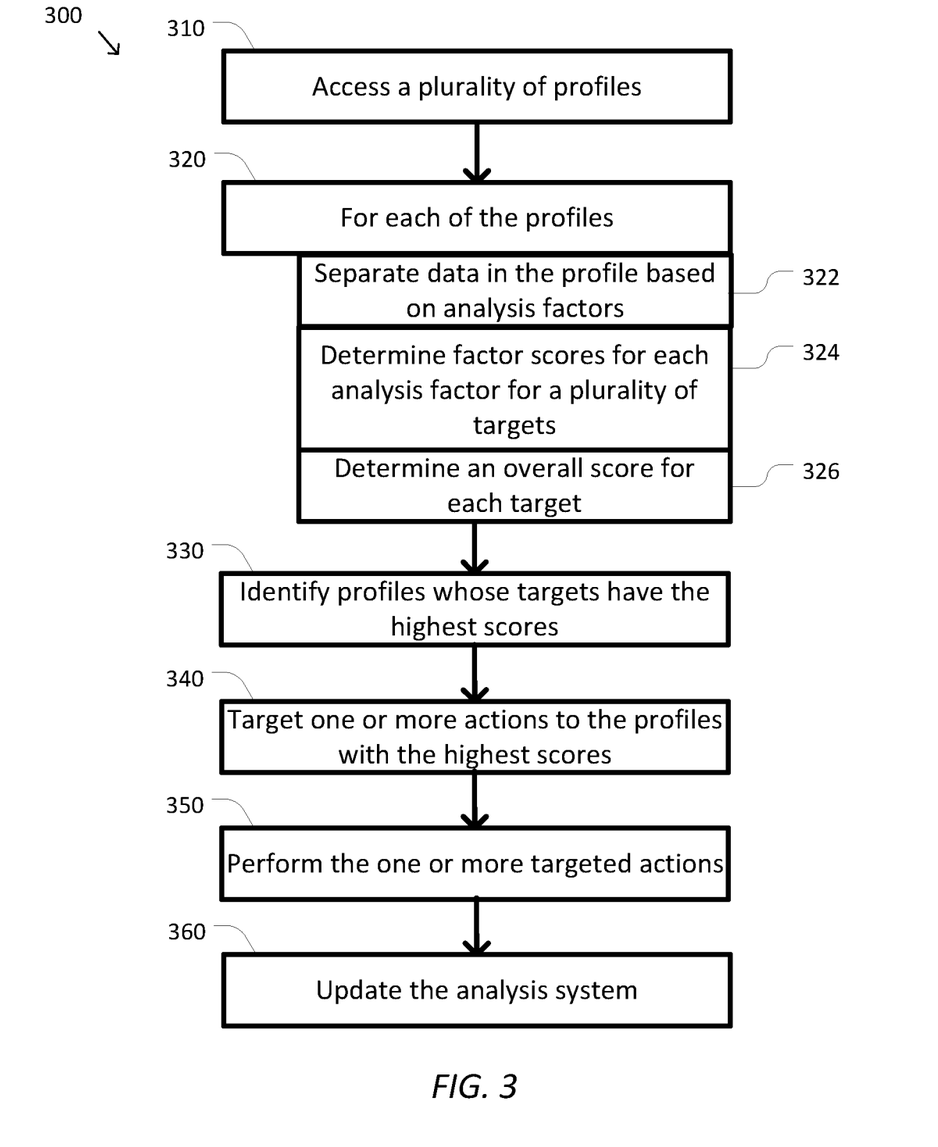
FIG. 3 is a simplified diagram of a method of targeting actions based on a multi-factor multi-label analysis according to some embodiments.

FIG. 3 is a simplified diagram of a method 300 of targeting actions based on a multi-factor multi-label analysis according to some embodiments. One or more of the processes 310-360 of method 300 may be implemented, at least in part, in the form of executable code stored on non-transitory, tangible, machine-readable media that when run by one or more processors (e.g., processor 110) may cause the one or more processors to perform one or more of the processes 310-360. In some embodiments, method 300 may correspond to the methods used by action module 130 to perform a multi-factor multi-label analysis of profiles 140 from profile repository 150 and then recommend and perform actions on one or more of the entities corresponding to the profiles 140. In some embodiments, some or all of the processes of method 300 may be performed by multi-factor multi-label analyzer 200.

At a process 310, a plurality of profiles is accessed. Each of the plurality of profiles contains data associated with a respective entity. In some examples, the plurality of profiles may be consistent with profiles 140. In some examples, the plurality of profiles may be accessed by reading them from a profile repository, such as profile repository 150. In some examples, the data may correspond to past metrics and/or measures associated with the entities, current metrics and/or measures associated with the entities, aggregate statistics associated with the entities, historical activities associated with the entities, and/or the like. In some examples, the data in the plurality of profiles may be obtained by periodically recording information about the activities of the entities, tasks performed for and/or by the entities, and/or the like.

In some examples, when the profiles are associated with maintenance activities of motor vehicles (e.g., the entities), the data may include information such as dates of previous maintenance activities, odometer readings of previous maintenance activities, a current date, a current odometer reading, an average number of daily miles, an average driving speed, trends in fuel economy, installed part numbers, installation dates, installation odometer readings, and/or the like. In some examples, when the profiles are associated with merchants (e.g., the entities) who may purchase goods and/or services from a financial services provider (e.g., a bank, a transaction processor, an entity such as PayPal, Inc., and/or the like), the data may include information such as business profiles (e.g., duration of time as a customer and/or service user, merchant category, and/or the like), activity profiles (e.g., transaction volume over one or more reporting periods, number of transactions over one or more reporting periods, average transaction volume, average number of transactions, growth trend over recent reporting periods, claim and/or complaint rates over a reporting period, loss rates, number of days since last transaction, and/or the like), buyer behaviors (e.g., use of the goods or services by the merchant to make purchases), customer value metrics (e.g., total revenue/loss, total cost, and/or the like), merchant growth in various metrics over recent reporting periods, usage profiles (e.g., one or more products or services featured in merchant materials, such as on the merchant web site), balances (e.g., average daily balances, maximum negative balance, number of days with a negative balance in recent reporting windows, and/or the like), wallet information (e.g., inclusion of other accounts, credit cards, or debit cards in a wallet service), application history (e.g., pending applications and/or approvals for accounts and services), interaction profiles (e.g., number and/or dates of inbound communications), restriction histories (e.g., number and/or type of account or service restrictions), risk features (e.g., number and/or amount of disputed transactions, bad transaction rate, loss rate, and/or the like), marketing history (e.g., number of responses to targeted advertising such as emails, web page banners, and/or the like), tracking activities (e.g., number of visits to product web pages, and/or the like), and/or the like. In some examples, merchant, customer, and/or similar profiles may also be used to perform fraud prediction, satisfaction prediction, next transaction prediction, and/or the like.

At a process 320, each of the profiles accessed during process 310 is processed and analyzed. In some examples, the data in each of the profiles is processed by processes 322, 324, and 326 to evaluate whether the entity associated with the respective profile would be a good target for one or more targeted actions. For the sake of illustration, processes 320-326 are described in terms of the embodiments described in FIG. 4, which is a simplified diagram of a multi-factor multi-label analysis system 400 according to some embodiments. In some embodiments, portions of multi-factor multi-label analysis system 400 may include multi-factor multi-label analyzer 200. However, it is understood that this is exemplary only and that other structures and/or arrangement of modules and components may be used to perform processes 320-326.

Figure 4:
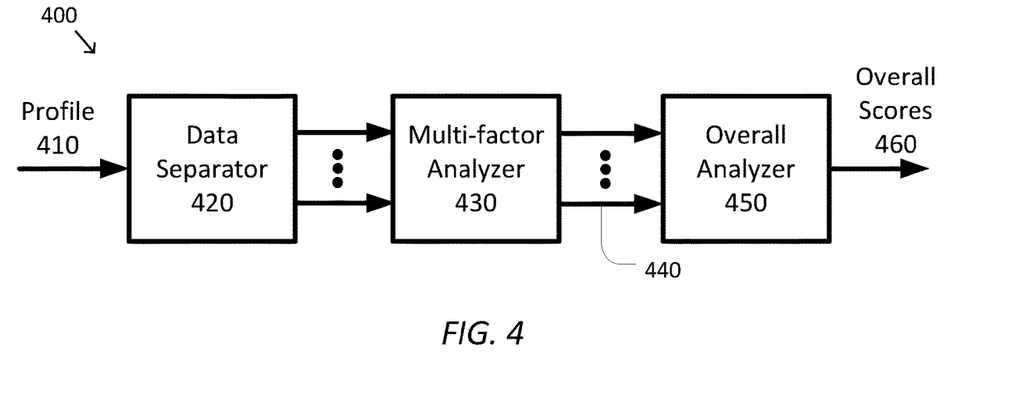
FIG. 4 is a simplified diagram of a multi-factor multi-label analysis system according to some embodiments.

At the process 322, the data in a profile (e.g., a profile 410) is separated based on a plurality of analysis factors. In some examples, the separating is performed by a data separator, such as a data separator 420. In some examples, not all of the data in a profile is suitable for each of the analysis factors. Thus, the data in the profile is separated so that the data is supplied for analysis against a subset of the analysis factors. In some examples, some data is suitable for two or more, and possibly all, of the analysis factors. In some examples, some data is suitable for just a single analysis factor. Each of the analysis factors corresponds to a different facet and/or way of evaluating the entity associated with the profile. In some examples, the different analysis factors may be separable and/or overlap to some extent. In some examples, the different analysis factors may yield possibly contradictory recommendations regarding a particular targeted action. How the data is separated during process 322 depends significantly on the types of data being received, the types of multi-factor analysis that is being performed, and the analysis factors being used.

In some examples, when the profiles are associated with maintenance activities of motor vehicles as described above, the analysis factors may include one or more of maintenance cost, projected downtime if maintenance is deferred, equipment lifetime, and/or the like. Each of these analysis factors may consider different portions of the data in the profiles accessed during process 310 and being considered during the current iteration of process 320. For example, the data in the profiles that is associated with part numbers and/or the like is separated from the rest of the data so that it can be passed to an analyzer that considers the maintenance cost analysis factor. Similarly, data associated with part numbers, installation information, current date and odometer readings, average number of daily miles, and/or the like is separated so that it can be passed to an analyzer that considers the projected downtime and equipment lifetime analysis factor. The data is also separated similarly for other analysis factors.

In some examples, when the profiles are associated with merchants in a system for targeted advertising and marketing as discussed above, the analysis factors may include one or more of merchant fit for a particular product or service, merchant engagement with marketing and/or information associated with the particular product or service, and/or the like. Each of these analysis factors may consider different portions of the data in the profiles accessed during process 310 and being considered during the current iteration of process 320. For example, the data in the profiles that is associated with business profiles, activity profiles, buyer behaviors, customer value metrics, merchant growth, usage profiles, balances, wallet information, application history, interaction profiles, restriction histories, risk features, and/or the like is separated from the rest of the data so that it can be passed to an analyzer that considers the merchant fit analysis factor. Similarly, the data associated with marketing history, tracking activities, and/or the like is separated from the rest of the data so that it can be passed to an analyzer that considers the merchant engagement analysis factor, and/or the like.

At the process 324, factor scores for each of the analysis factors are determined for each of a plurality of targets. In the examples of FIG. 4, the data as separated by data separator 420 is passed to a multi-factor analyzer 430 that determines the factor scores 440 for each combination of one of the analysis factors and each one of the targets. In other words, for each of the targets, a factor score for that target as evaluated by each of the analysis factors is determined.

In some examples, when the profiles are associated with maintenance activities of motor vehicles, the targets may correspond to a maintenance activity such as perform an oil change, rotate the tires, replace the timing belt, and/or the like. In some examples, the factor scores include a maintenance cost score for an oil change, a projected downtime score for deferring an oil change, an equipment lifetime score for an oil change, a maintenance cost score for rotating the tires, a projected downtime score for deferring rotating the tires, an equipment lifetime score for rotating the tires, a maintenance cost score for replacing the timing belt, a projected downtime score for deferring replacing the timing belt, an equipment lifetime score for replacing the timing belt, and/or the like.

In some examples, when the profiles are associated with merchants in a system for targeted advertising and marketing, the targets may correspond to specific products and/or services that are provided and may be of interest to the merchants. In some examples, the factor scores include a merchant fit score, a merchant interest score, and/or the like for each of the specific products and services. In the examples of a financial service provider (such as a bank or PayPal, Inc.), the specific products may include a professional product line, an express checkout product line, a payment service, a selling platform, a point of sale service, a cross-border service, a mobile service, an invoicing service, a credit and/or debit card service, and/or the like.

At the process 326, an overall score for each of the targets is determined. In the examples of FIG. 4, the factor scores 440 from multi-factor data analyzer 430 are passed to an overall analyzer 450 to generate an overall score 460 for each of the targets. In some examples, the overall score for each of the targets corresponds to a combination and/or an aggregation of the separate factor scores for that respective target. In some examples, when the profiles are associated with maintenance activities of motor vehicles, an overall score for perform an oil change is determined from the maintenance cost score, the projected downtime score, the equipment lifetime score, and/or the other factor scores. Similar overall scores are determined for the rotating the tires, replacing the timing belt, and/or the like. In some examples, when the profiles are associated with merchants in a system for targeted advertising and marketing, an overall score is determined for each of the specific products based on the merchant fit score, the merchant interest score, and/or the other factor scores associated with that specific product. In some examples, the overall scores may correspond to a propensity for the merchant to purchase and/or adopt the targets products or services within a predetermined period of time.

At a process 330, the profiles whose targets have the highest scores are identified. Once each of the profiles is processed by the analyses of processes 320-326 and a factor score for each of the combinations of targets and analysis factors and an overall score for each of the targets is determined, the target and profile combinations having the highest scores are identified. In some examples, the identification may be based just on the overall scores that each target received for each profile. In some examples, the identification may be based on both the overall scores and the analysis factor scores that each target received for each profile. In some examples, the highest scores may be identified by sorting the scores (e.g., using a bubble sort, an insertion sort, and/or the like). In some examples, the highest scores are those scores having a value above a predetermined and configurable threshold. In some examples, a number of profiles and targets identified as having the highest scores may be based on a predetermined number of targets and profiles that are to be targeted, a predetermined percentage of the targets and profiles, a predetermined budget, and/or the like. In some examples, the predetermined budget may be determined by selecting the combinations of targets and profiles in order starting with the combination having the highest score and then subtracting from the budget a cost associated with the combination of the target and the profile until the predetermined budget is exhausted.

At a process 340, one or more actions are targeted to the profiles with the highest scores. In some examples, the one or more actions to target may be selected based on the combinations of the profile and the target identified during process 330. In some examples, one or more profiles may be targeted with multiple actions, such as when the identified combinations include more than one combination for a specific profile. In some examples, some profiles may not be targeted with any actions.

At a process 350, the one or more targeted actions is performed. In some examples, each of the targeted actions corresponds to the target in the combination of the target and profile that was identified as having one of the highest scores, and the targeted action is performed on the entity associated with the profile in the combination. As an example, when the replacing the timing belt for motor vehicle 334 is identified as having one of the highest scores, the action performed is the replacing of the timing belt for motor vehicle 334. As another example, when the cross border target for Acme, Inc. is identified as having one of the highest scores, the action performed is the targeting of marketing (e.g., a sales call, an email campaign, a direct mail campaign, and/or the like) for the cross-border service to Acme, Inc. In some examples, performing the targeted action may include placing the targeted action in a queue for processing by another module, another system, and/or the like.

At a process 360, the analysis system is updated. In some examples, when the analysis system includes one or more deep learning modules (such as one or more neural networks in multi-factor analyzer 430 and/or overall analyzer 450), the deep learning system may be updated using training data based on the data in the profiles and ongoing activity and/or monitoring of the entities associated with the profiles. In some examples, the training data may be obtained from entities and profiles even when no targeted action was performed for those entities or profiles. In some examples, when the profiles are associated with maintenance activities of motor vehicles, periodic snapshots of the data in each of the profiles may be saved and maintenance, repair, and failure costs and events tracked to provide actual maintenance costs, actual downtimes for failures when maintenance is deferred and/or the like to determine ground truth values for the various factors and overall scores that may be used as training data samples. In some examples, when the profiles are associated with merchants in a system for targeted advertising and marketing, periodic snapshots of the data in each of the profiles may be saved and actual purchase and/or adoption of the products and services corresponding to the marketing target by the merchants is tracked to determine the ground truth values.

In some examples, the training samples generated from the snapshots of the profiles and the tracked activity may be used to periodically train the deep learning systems using a supervised learning algorithm, such as stochastic gradient decent and/or the like. In some examples, the supervised learning algorithm presents the snapshots of the profiles to the deep learning systems, uses forward propagation to generate the factor and overall scores, determines differences between the generated factor and overall scores to the ground truth factor and overall scores to estimate a loss function, uses the differences to estimate a gradient of the loss function, and then back propagates the differences to weights and biases of the deep learning system according to the estimate of the gradient of the loss function.

Figure 5:
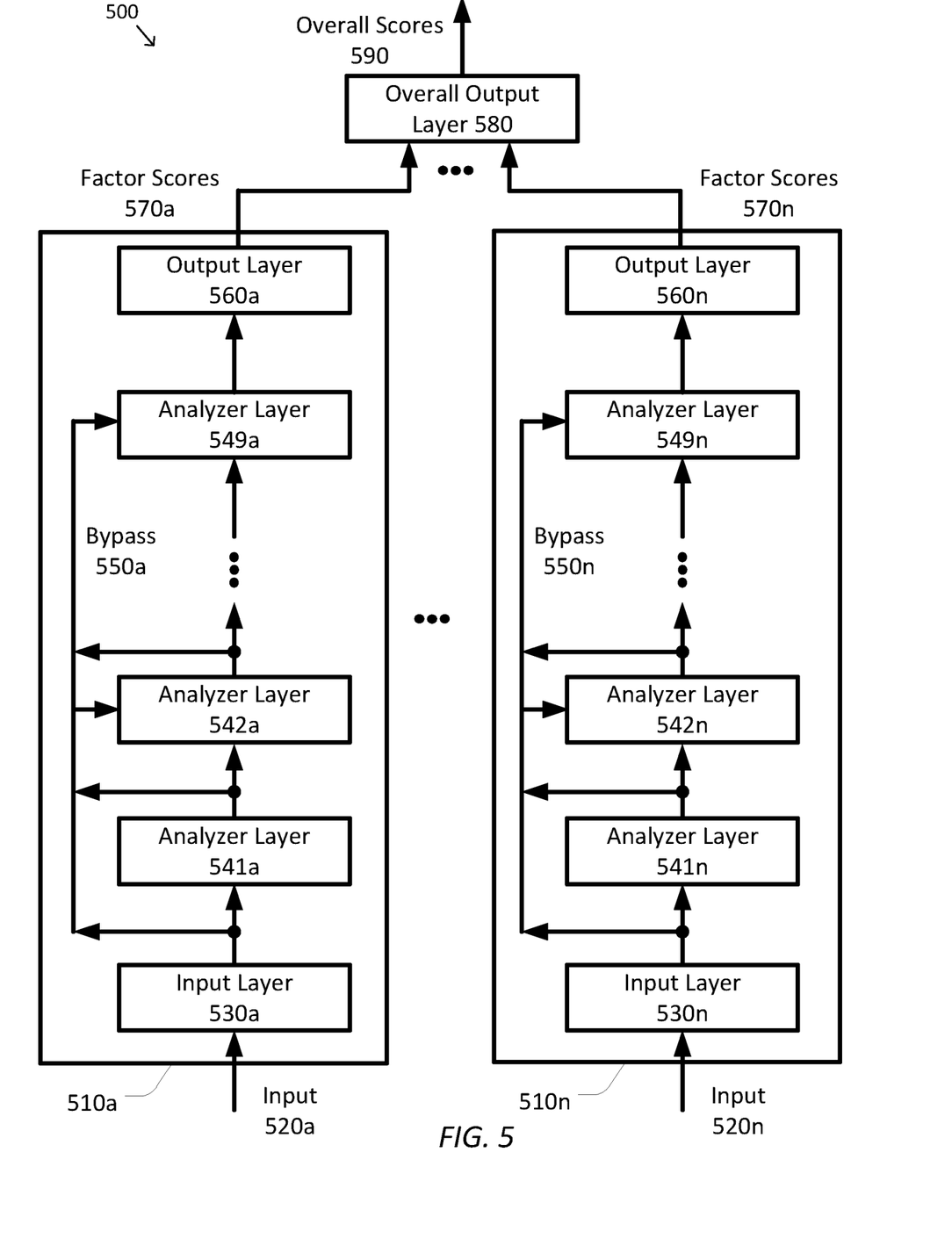
FIG. 5 is a simplified diagram of neural networks for performing multi-factor multi-label analysis according to some embodiments.

FIG. 5 is a simplified diagram of neural networks 500 for performing multi-factor multi-label analysis according to some embodiments. In some embodiments, neural networks 500 are consistent with multi-factor multi-label analyzer 200. As shown in FIG. 5, the neural networks 500 include a plurality of analysis factor neural networks 510a-510n and an overall output layer 580. In some embodiments, multi-factor analyzer 430 includes the analysis factor neural networks 510a-510n and/or overall analyzer 450 includes overall output layer 570. In some embodiments, the analysis factor neural networks 510a-510n are used to perform process 324 and/or overall output layer 580 is used to perform process 326. The number of analysis factor neural networks 510a-510n depends on the number of analysis factors used in the multi-factor analysis performed by the neural networks 500. Thus, when the multi-factor analysis uses two analysis factors, there are two analysis factor neural networks 510a-510b; when the multi-factor analysis uses three analysis factors, there are three analysis factor neural networks 510a-510c, and so forth for other numbers of analysis factors. The analysis factor neural networks 510a-510n are generally kept separate to take advantage of data separating, such as that performed by data separator 420 and/or during process 322. In some examples, the separation of the analysis factor neural networks 510a-510n into separate neural networks allows each of the analysis factor neural networks 510a-510n to focus on the input data and modeling relevant to its own particular analysis factor without having to compete with the other analysis factor neural networks 510a-510n and/or filter out input data generally relevant only to the other analysis factor neural networks 510a-510. This contrasts with other approaches to multi-factor analysis where a larger combined neural network is relied on to internally determine which input data is irrelevant and to internally separate neurons to address each of the separate analysis factors.

As further shown, each of the analysis factor neural networks 510a-510n has a similar internal structure. Focusing on analysis factor neural network 510a, analysis factor neural network 510a receives an input 520a at an input layer 530a. Input 520a corresponds to the data from a profile that is relevant to the analysis factor being considered by analysis factor neural network 510a. In some examples, input 520a is received from a data separator, such as data separator 420. Input layer 530a processes input 520a so that it can be processed by analyzer layers 531a-539n. Input layer 530a encodes input 520a into a form that may be used by analyzer layers 531a-539a. In some examples, portions of input 520a that correspond to numeric information (e.g., periods of time, quantities, currency amounts, and/or the like) may be pre-processed by scaling so that the relative magnitudes of the numeric information are roughly similar across each of the numeric inputs in input 520a. In some examples, the scaling includes converting the numeric values to z-scores based on how many standard deviations each of the numeric values is from a mean of the same corresponding numeric values across each of the possible inputs (e.g., by finding the mean and standard deviation for the corresponding numeric values in each of the profiles in a profile repository). In some examples, portions of input 520a that correspond to categorical information (e.g., yes, no, high, medium, low, item A, item B, and/or the like) may be processed via an encoding to convert the categorical values to numeric values. In some examples, the encoding may use a weight of evidence approach. The output from input layer 530a is then passed to analyzer layers 541a-549a, either directly as in the case of analyzer layer 541a or via bypass path 550a.

Analyzer layers 541a-549a are arranged in a serial chain from analyzer layer 541a through 549a. As a first one of the analyzer layers 541a-549a in the serial chain, analyzer layer 541a receives just the output from input layer 530a. Each of the other analyzer layers 542a-549a receives at least the output from a previous analyzer layer 542a-548a. In some examples, each of the other analyzer layers 542a-549a may also receive the output from input layer 530a and/or the output from each of the other previous analyzer layers 541a-547a in the serial chain via bypass path 550a. The number of analyzer layers 541a-549a in analysis factor neural network 510a may depend on a complexity of the analysis factor being considered by analysis factor neural network 510a and may include one, two, three, four, five, six, or more analyzer layers 541a-549a. Examples of possible embodiments of analyzer layers 541a-549a are described in further detail below with respect to FIG. 6.

Figure 6:
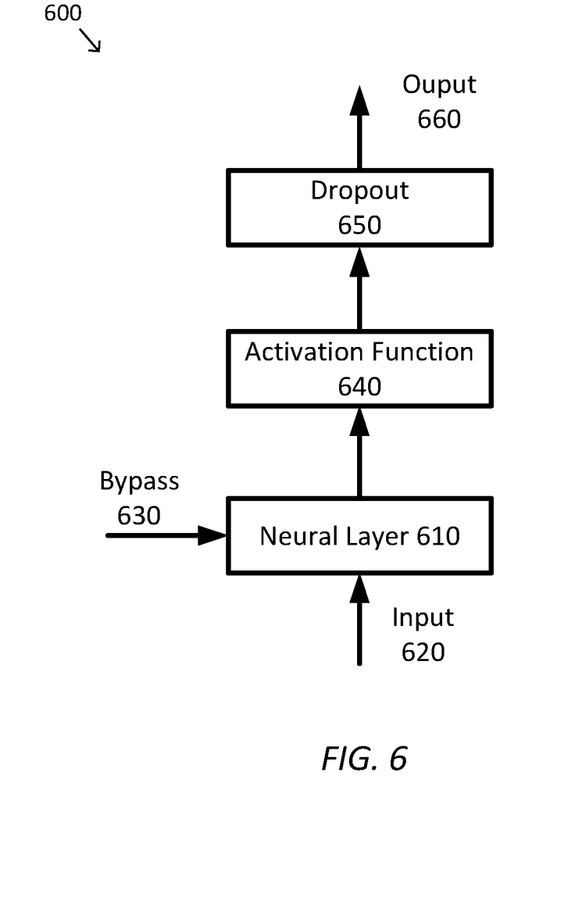
FIG. 6 is a simplified diagram of an analyzer layer for multi-factor multi-label analysis according to some embodiments.

FIG. 6 is a simplified diagram of an analyzer layer 600 for multi-factor multi-label analysis according to some embodiments. In some embodiments, analyzer layer 600 may be representative of any of the analyzer layers 541a-549a. As shown in FIG. 6, analyzer layer 600 includes a neural layer 610, which receives information via an input 620 and a bypass path 630. In some examples, bypass path 630 is consistent with bypass path 550a. When analyzer layer 600 is a first analyzer layer in a serial chain, bypass path 630 is omitted and input 620 is received from an input layer, such as input layer 530a. When analyzer layer 600 is a second or subsequent analyzer layer in a serial chain, input 620 is received from an output from a next previous analyzer layer in the serial chain and bypass path 630 provides one or more of the output from the input layer and the output from each of the other previous analyzer layers in the serial chain. Neural layer 610 includes a plurality of neurons, such as perceptrons. In some examples, neural layer operates according to Equation 1, where x corresponds to input 620 and bypass path 630, W is a set of trainable weights, b is a set of trainable biases, and a is the output of neural layer 610 and includes a vector for each of the neurons in neural layer 610. In some examples, neural layer 610 may be densely connected with many of its neurons receiving most of the inputs in input 620 and/or bypass path 630. In some examples, neural layer 610 may be fully connected with each of its neurons receiving each of the inputs in input 620 and bypass path 630.

$$a = \Sigma(Wx+b) \qquad \text{Equation 1}$$

The output a of neural layer 610 is passed to an activation function 640, which generates f(a), where f is activation function 640, for each of the vectors in a. In some examples, activation function 640 introduces non-linearity to the computations performed by analyzer layer 600. In some examples, activation function 640 may be selected from any suitable neural network activation function, such as log-sigmoid (logsig), rectified linear unit (RELU) activation, tangent sigmoid (tansig), hyperbolic tangent (tanh), and/or the like. In some examples, activation function 640 may be selected at training time using a hyper parameter that allows the best activation function 640 to be chosen for analyzer layer 600 to provide the best modeling for the respective analysis factor neural network. In some examples, each of the activation functions 640 in each layer of the serial chain may be the same or one or more of the activation functions 640 may be different from the others.

The output of activation function 640 is passed to a dropout layer 650. Dropout layer 650 operates only when analyzer layer 600 is being trained and is omitted when analyzer layer 600 is being used for feed forward analysis without training. Dropout layer 650 operates by randomly selecting a configurable percentage (e.g., 30 percent) of the activated outputs from activation function 640 and setting them to zero before passing them on to the next analyzer layer or to the bypass path. In some examples, dropout layer 650 helps prevent overfitting during the training of analyzer layer 600.

Referring back to FIG. 5, the output of the last analyzer layer in the serial chain (e.g., analyzer layer 549a) is passed to an output layer 560a. Output layer 560a includes a neuron for each of the labels and/or targets being evaluated by analysis factor neural network 510a. In some examples, the neurons in output layer 560a are densely and/or fully-connected layer with activation functions such as pure linear, logsig, RELU activation, tansig, tanh, and/or the like. In some examples, output layer 560a may include a softmax layer. Output layer 560a then generates the factor scores 570a corresponding to the analysis factor being implemented by analysis factor neural network 510a.

According to some embodiments, each of the other analysis factor neural networks 510b-510n include a structure and/or function similar to that of analysis factor neural network 510a. For example, as shown in FIG. 5, analysis factor neural network 510n receives input 520n at an input layer 530n. In some examples, input 520n may be the same, partially overlap, and/or be different from input 520a depending upon how the input is separated before being passed to analysis factor neural networks 510a and 510n. In some examples, input layer 530n may be similar to input layer 530 and may include a same number and/or a different number of neurons than input layer 530a. The output of input layer 530n is passed to a first analyzer layer 541n in a serial chain of analyzer layers 541n-549n. In some examples, the output of input layer 530n may also be passed to others of analyzer layers 542n-549n via a bypass path 550n. Each of the subsequent analyzer layers 542n-549n receives inputs from outputs of the previous analyzer layer 541n-548n in the serial chain and optionally from one or more of the outputs of input layer 530n and/or the outputs of the other previous analyzer layers 541n-547n. The output of analyzer layer is then passed to an output layer 560n, which generates factor scores 570n corresponding to the analysis factor being implemented by analysis factor neural network 510n.

The factor scores 570a-570n from analysis factor neural networks 510a-510n, respectively, are passed to overall output layer 580. Similar to output layer 560a, overall output layer 580 includes a neuron for each of the labels and/or targets being evaluated by neural network 500. In some examples, the neurons in overall output layer 580 are densely and/or fully-connected layer with activation functions such as pure linear, logsig, RELU activation, tansig, tanh, and/or the like. In some examples, overall output layer 580 may include a softmax layer. In some examples, overall output layer 580 computes a weighted sum of the corresponding factors scores 570a-570, such as by using a fully-connected layer and the pure linear activation function. Overall output layer 580 then generates overall scores 590 for each of the labels and/or targets. In some examples, factor scores 570a-570n correspond to factor scores 440 and/or overall scores 590 correspond to overall scores 460.

As discussed above and further emphasized here, FIGS. 5 and 6 are merely examples which should not unduly limit the scope of the claims. One of ordinary skill in the art would recognize many variations, alternatives, and modifications. According to some embodiments, overall output layer 580 may be coupled to the analysis factor neural networks 510a-510n with a different arrangement than is shown in FIG. 5. In some examples, rather than receiving the factor scores 570a-570n from output layers 560a-560n, respectively, overall output layer 580 may receive its input from the last analyzer layers in the serial chains (e.g., from analyzer layers 549a-549n). According to some embodiments, different analysis factor neural networks 510a-510n may use a same and/or a different activation function (e.g., activation function 640) in each of its respective analyzer layers 541-539. According to some embodiments, each of the analysis factor neural networks 510a-510n may have a same and/or a different number of analyzer layers 541-549 and/or 600.

Some examples of computing devices, such as computing device 100 may include non-transitory, tangible, machine readable media that include executable code that when run by one or more processors (e.g., processor 110) may cause the one or more processors to perform the processes of method 300. Some common forms of machine readable media that may include the processes of method 300 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly, and in a manner consistent with the scope of the embodiments disclosed herein.

What is claimed is:

1. A method, comprising:
accessing, by a server of a service provider, a plurality of profiles associated with a plurality of customers, the profiles comprising information for a first type of characteristics and a second type of characteristics of the respective customer of the plurality of customers;
separating, by the server of the service provider, the information into at least first information and second information, wherein the first information includes first multiple types of data, and wherein the second information includes second multiple types of data different from the first multiple types of data;
analyzing, by the server of the service provider and via two or more neural networks that share a common output layer, the plurality of profiles with regard to a product or a service offered to the respective customer, wherein the first information is analyzed, by a first neural network of the two or more neural networks, for a customer fit of the respective customer for the product or the service, and wherein the second information is analyzed, by a second neural network of the two or more neural networks different from the first neural network, for a customer engagement with marketing information previously presented to the respective customer;
determining, by the server of the service provider based on an output obtained from the common output layer based on said analyzing, a certain aspect of the product or the service offered to the respective customer; and
selecting, by the server of the service provider and based on said determining, the product or the service for the respective customer.

2. The method of claim 1,
wherein said determining the certain aspect of the product or the service offered to the respective customer is based on a first aspect and a second aspect,
wherein the first aspect is determined using at least one of the two or more neural networks based on the first type of characteristics; and
wherein the second aspect is determined using at least one of the two or more neural networks based on the second type of characteristics.

3. The method of claim 1, wherein said analyzing the plurality of profiles via two or more neural networks comprises:
determining, using the first neural network of the two or more neural networks that share the common output layer and based at least on the first type of characteristics, a first aspect of the product or the service offered to the respective customer; and
determining, using the second neural network of the two or more neural networks that share the common output layer and based at least on the second type of characteristics, a second aspect of the product or the service offered to the respective customer.

4. The method of claim 1,
wherein each of the two or more neural networks comprises a respective input layer, and a respective plurality of analyzer layers configured in a respective chain.

5. The method of claim 4, wherein each of the plurality of analyzer layers comprises:
a neural network layer having a plurality of neurons receiving input from one or more of the input layers or one or more of the plurality of analyzer layers; and
an activation function for each of the plurality of neurons selected from a plurality of activation functions during training of the each of the two or more neural networks.

6. The method of claim 1, wherein the first multiple types of data share no overlap with the second multiple types of data.

7. The method of claim 1, further comprising:
providing the selected product or the service or targeted advertising or offers related to the selected product or the service to the respective customer.

8. The method of claim 1, wherein the certain aspect of the product or the service comprises a fit of the respective customer with respect to the product or the service and a predicted interest level of the respective customer with respect to the product or the service.

9. The method of claim 1, wherein the separating is performed by a data separator module, wherein the analyzing is performed by an analyzer module coupled to the data separator module, and wherein an output of the data separator module is an input of the analyzer module.

10. A service provider server, comprising:
a non-transitory memory storing instructions; and
a processor configured to execute the instructions to cause the service provider server to:
access first information that includes multiple types of first data associated with a customer;
access second information that includes multiple types of second data associated with the customer, the multiple types of second data being different from the multiple types of first data;
analyze, via a first neural network of two or more neural networks that share a common output layer, the first information for a first type of characteristic of the customer with regard to a product or a service offered to the customer, the first type of characteristic associated with a fit of the customer with respect to the product or the service;
analyze, via a second neural network of the two or more neural networks, the second information for a second type of characteristic of the customer with regard to the product or the service offered to the customer, the second type of characteristic associated with an engagement of the customer with previously presented marketing information;
generate, based on the analysis of the first information and the second information, an overall score for the customer with respect to the product or the service available to the customer;
determine, based on the overall score, an action related to the product or the service that is available to the customer; and
in response to a determination of the action, perform the action related to the product or the service.

11. The service provider server of claim 10,
wherein the overall score is generated based on a first aspect and a second aspect of the product or the service,
wherein the first aspect is determined using at least one of the two or more neural networks based on the first type of characteristic; and
wherein the second aspect is determined using at least one of the two or more neural networks based on the second type of characteristic.

12. The service provider server of claim 11, wherein the action is determined for a plurality of customers that include the customer, and wherein the action that is performed is performed for a subset of the plurality of customers that meet a specified overall score threshold.

13. The service provider server of claim 10,
wherein each of the two or more neural networks comprises a respective input layer, and a respective plurality of analyzer layers configured in a respective chain, wherein each of the plurality of analyzer layers comprises:
a neural network layer having a plurality of neurons receiving input from one or more of the input layer or one or more of the plurality of analyzer layers; and
an activation function for each of the plurality of neurons selected from a plurality of activation functions during training of the each of the two or more neural networks.

14. The service provider server of claim 10, wherein the action is performed by providing targeted advertising or offers related to the product or the service to the respective customer.

15. The service provider server of claim 10, wherein the first information and the second information are separated based on a plurality of analysis factors.

16. A non-transitory machine-readable medium including executable code that when executed by one or more processors cause a computing device to perform operations comprising:
separating, based on a plurality of analysis factors, profile information of a customer into at least a first type of characteristic and a second type of characteristic, wherein the first type of characteristic corresponds to a plurality of first types of data, and wherein the second type of characteristic corresponds to a plurality of second types of data different from the first type;
analyzing, via a first neural network of two or more neural networks that share a common output layer, a fit of the customer with regard to a product or a service offered to the customer;
analyzing, via a second neural network of the two or more neural networks, a predicted interest level of the customer with regard to the product or the service offered to the customer, wherein the predicted interest level is analyzed based on an engagement of the customer with previously presented marketing information;
generating, based on the analyzing of the fit of the customer and the analyzing of the predicted interest level, an overall score for the customer with respect to the product or the service available to the customer;
determining, based on the overall score, an action related to the product or the service that is available to the customer; and
in response to the determining of the action, performing the action related to the product or the service.

17. The non-transitory machine-readable medium of claim 16, wherein the analyzing the fit of the customer and the analyzing the fit of the customer are performed concurrently.

18. The non-transitory machine-readable medium of claim 16, wherein an overlap exists between the plurality of first types of data and the plurality of second types of data.

19. The non-transitory machine-readable medium of claim 16, wherein each of the two or more neural networks comprises a respective input layer, and a respective plurality of analyzer layers configured in a respective chain, wherein each of the plurality of analyzer layers comprises:
a neural network layer having a plurality of neurons receiving input from one or more of the input layer or one or more of the plurality of analyzer layers; and
an activation function for each of the plurality of neurons selected from a plurality of activation functions during training of the each of the two or more neural networks.

20. The non-transitory machine-readable medium of claim 16,
wherein said performing the action comprises providing targeted advertising or offers related to the product or the service to the respective customer.

* * * * *